(12) United States Patent
Smith

(10) Patent No.: US 7,848,248 B2
(45) Date of Patent: Dec. 7, 2010

(54) METHOD AND APPARATUS FOR MEASURING ONE WAY TRANSMISSION DELAY

(75) Inventor: Wallace Smith, Sea Girt, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 191 days.

(21) Appl. No.: 12/035,061

(22) Filed: Feb. 21, 2008

(65) Prior Publication Data

US 2009/0213835 A1 Aug. 27, 2009

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/28 (2006.01)

(52) U.S. Cl. .......................... 370/252; 37/250
(58) Field of Classification Search .............. 370/252, 370/503, 352; 455/502
See application file for complete search history.

(56) References Cited

U.S. PATENT DOCUMENTS

| | | | |
|---|---|---|---|
| 2002/0131604 A1* | 9/2002 | Amine | 381/58 |
| 2006/0234739 A1* | 10/2006 | Thadasina et al. | 455/502 |
| 2007/0116064 A1* | 5/2007 | Kim et al. | 370/508 |
| 2008/0151771 A1* | 6/2008 | Dowse | 370/252 |

* cited by examiner

*Primary Examiner*—Ricky Ngo
*Assistant Examiner*—David Oveissi

(57) ABSTRACT

A method and apparatus enabling the measurement of one way delay in each of the two directions of transmission from a single location are disclosed. The method measures a first roundtrip delay at a first location between a first endpoint and a second endpoint over a first communication network, and measures a second roundtrip delay between a third endpoint and a fourth endpoint over a second communication network with symmetric delay characteristics. The method performs synchronous recordings of a test signal that is sent simultaneously from the second endpoint to the first endpoint and from the fourth endpoint to the third endpoint, to measure an arrival time (t1) of the test signal over the first communication network, and, an arrival time (t2) of the test signal over the second communication network t2, where the arrival times (t1) and (t2) are used to calculate an one way transmission delay in the first communication network.

20 Claims, 3 Drawing Sheets

METHOD AND APPARATUS FOR MEASURING ONE WAY TRANSMISSION DELAY

The present invention relates generally to communication networks and, more particularly, to a method and apparatus for measuring one way connection delay using a single test point in communication networks, e.g., packet networks such as Voice over Internet Protocol (VoIP) networks.

BACKGROUND OF THE INVENTION

An interactive voice call requires transmissions of audio information in both directions between two call termination points. VoIP telephone connections often exhibit large and significant differences in one way delay in the two directions of transmission for a voice call. The VoIP speech signals are typically coded, decoded, and buffered by different network elements in each direction. Dissimilar packet routing and misbehaving network elements can also contribute to the differences in one way delay in different directions of a call connection. A common practice used to calculate one way delay is to measure the round trip delay, assuming the delays in the two directions are equal, and to divide the round trip delay by two. For the reasons stated above, this method often provides inaccurate one way connection delay measurements within VoIP networks.

Even though it is possible to measure the delay in each direction if synchronized test equipment is present at both call termination points of a call connection, this may be practical only if both ends of the connection are present at a single location or collocated. If the two call terminating points are not collocated, test equipment capable of playing and recording test audio files and additional testing personnel would need to be deployed to both call terminating points. This incurs significant costs associated with the field workforce and equipment transport under this type of testing arrangement.

SUMMARY OF THE INVENTION

In one embodiment, the present invention enables the measurement of one way delay in each of the two directions of transmission from a single location. For example, a method measures a first roundtrip delay (RTD1) at a first location between a first endpoint and a second endpoint over a first communication network, and measures a second roundtrip delay (RTD2) at the first location between a third endpoint and a fourth endpoint over a second communication network with symmetric delay characteristics. The method performs synchronous recordings of a test signal that is sent simultaneously from the second endpoint to the first endpoint and from the fourth endpoint to the third endpoint, to measure an arrival time (t1) of the test signal over the first communication network, and, an arrival time (t2) of the test signal over the second communication network t2, where the arrival times (t1) and (t2) are used to calculate an one way transmission delay in the first communication network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, VoIP telephone connections often exhibit large and significant differences in one way delay in the two directions of transmission for a voice call. The common practice used to calculate one way delay is to measure the round trip delay, and to divide the round trip delay by two, thereby assuming that the delays in the two directions are equal. For the reasons stated above, this method often provides inaccurate one way connection delay measurements within VoIP networks.

To address this criticality, the present invention enables the measurement of one way delay (broadly defined as one way transmission delay) in each of the two directions of transmission on a VoIP (Voice over Internet Protocol) connection from a single, centrally located test endpoint. In one embodiment, a first call to a far end terminating location via a VoIP network is set up. A second simultaneous call to the same far end terminating location via a Time Division Multiplexing (TDM) network or other network that exhibits symmetric connection delay in both directions is also set up. Round trip delays for the two call connections are measured. An audio test signal is then sent from the far end location using the two set up call connections and the arrival time associated with each call connection is then recorded using synchronized test sets. Then, one way delay in each direction of the VoIP call can be derived.

The present invention does not require any equipment at the site or any specially trained personnel to operate it at the far end call termination location. The delay testing equipment is centrally located at the call origination. Namely, the present invention uses the properties of a second connection with symmetric delay to determine the asymmetric delays of a first connection. The measurements are performed at the call origination point and do not require any special test equipment at the terminating or remote endpoint of the calls.

Figure 1:
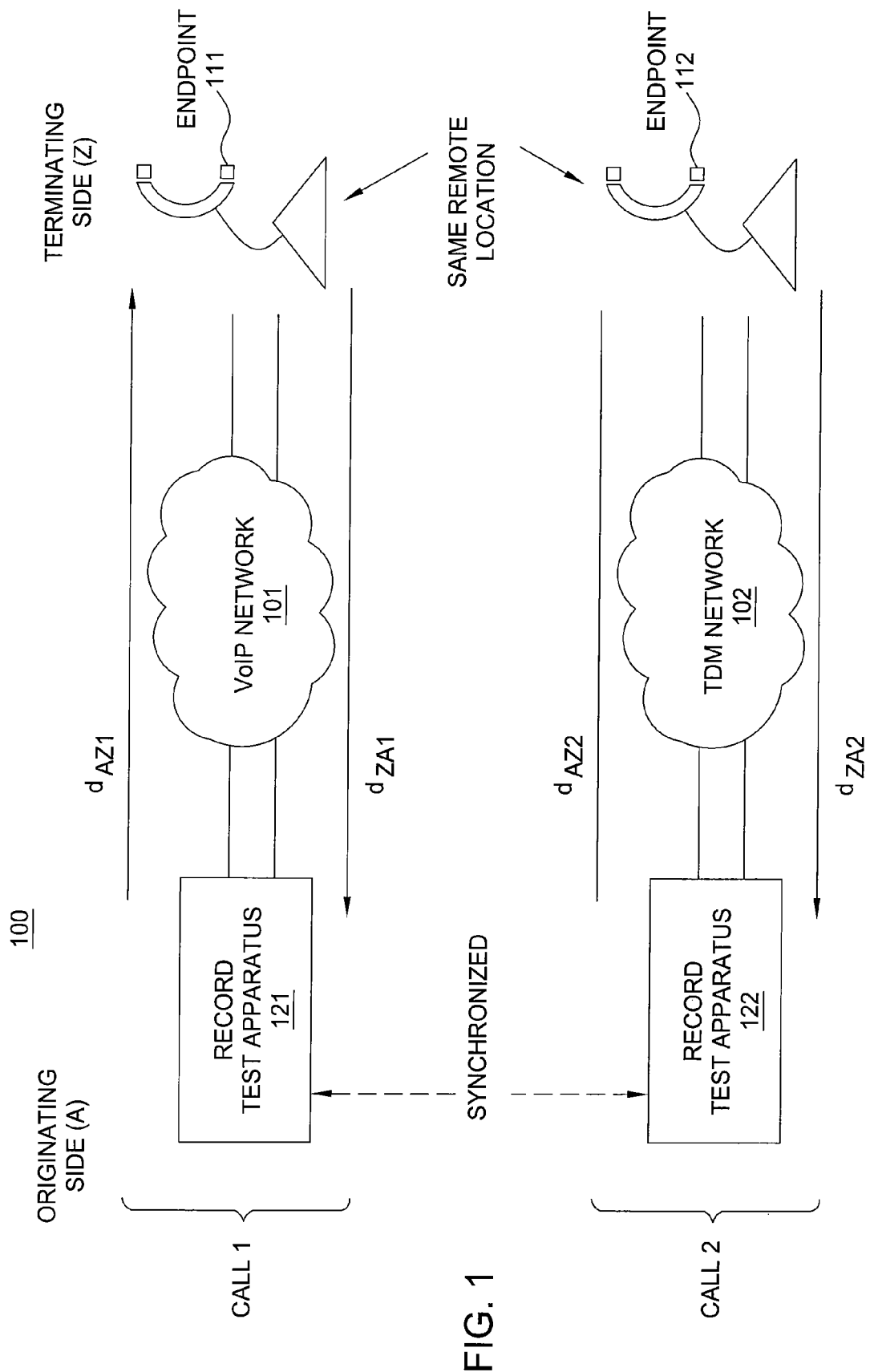
FIG. 1 illustrates an exemplary testing configuration in a Voice over Internet Protocol (VoIP) network related to the present invention.

FIG. 1 illustrates an exemplary testing configuration 100 in a Voice over Internet Protocol (VoIP) network related to the present invention. In FIG. 1, test apparatus 121 and test apparatus 122 with play and record functionalities are deployed at the originating side A of a call connection in the same location. A first call, call 1, is set up between test apparatus 121 (broadly a first endpoint) and endpoint 111 (broadly a second endpoint) via a VoIP network 101. A second call, call 2, is set up between test apparatus 122 (broadly a third endpoint) and endpoint 112 (broadly a fourth endpoint) via a network 102 with symmetric delay characteristics. In one embodiment, network 102 is a Time Division Multiplexing (TDM) network. Note that endpoints 111 and 112 are collocated in the same far end or remote location, terminating side Z.

For call 1, the delay in the direction from test apparatus 121 to endpoint 111, denoted as $d_{AZ1}$, is not the same as the delay in the direction from endpoint 111 to test apparatus 121, denoted as $d_{ZA1}$.

For call 2, the delay in the direction from test apparatus 122 to endpoint 112, denoted as $d_{AZ2}$, is the same as the delay in the direction from endpoint 112 to test apparatus 122, denoted as $d_{ZA2}$.

Further note that test apparatus 121 and test apparatus 122 are synchronized. It should be noted that test apparatus 121 and test apparatus 122 can be implemented as two separate devices or they can be implemented as a single device having two different sets of inputs/outputs.

The round trip delay (RTD1) from the call origination, test apparatus 121, to the termination, endpoint 111, and back is measured over the VoIP connection in call 1. The round trip delay (RTD2) from the call origination, test apparatus 122, to the termination, endpoint 112, and back is measured over the TDM connection in call 2. Simultaneous and synchronized recordings are then started at the two originating terminations as a test signal is simultaneously played into both terminating phones, endpoint 111 and endpoint 112. For example, a test message is played into the handset of both endpoint 111 and endpoint 112 simultaneously. Using the present invention, the delay in both directions of transmission through the VoIP call can then be derived from the two round trip delay measurements, RTD1 and RTD2, and the test signal arrival times at the call origination at a single test point.

Figure 2:
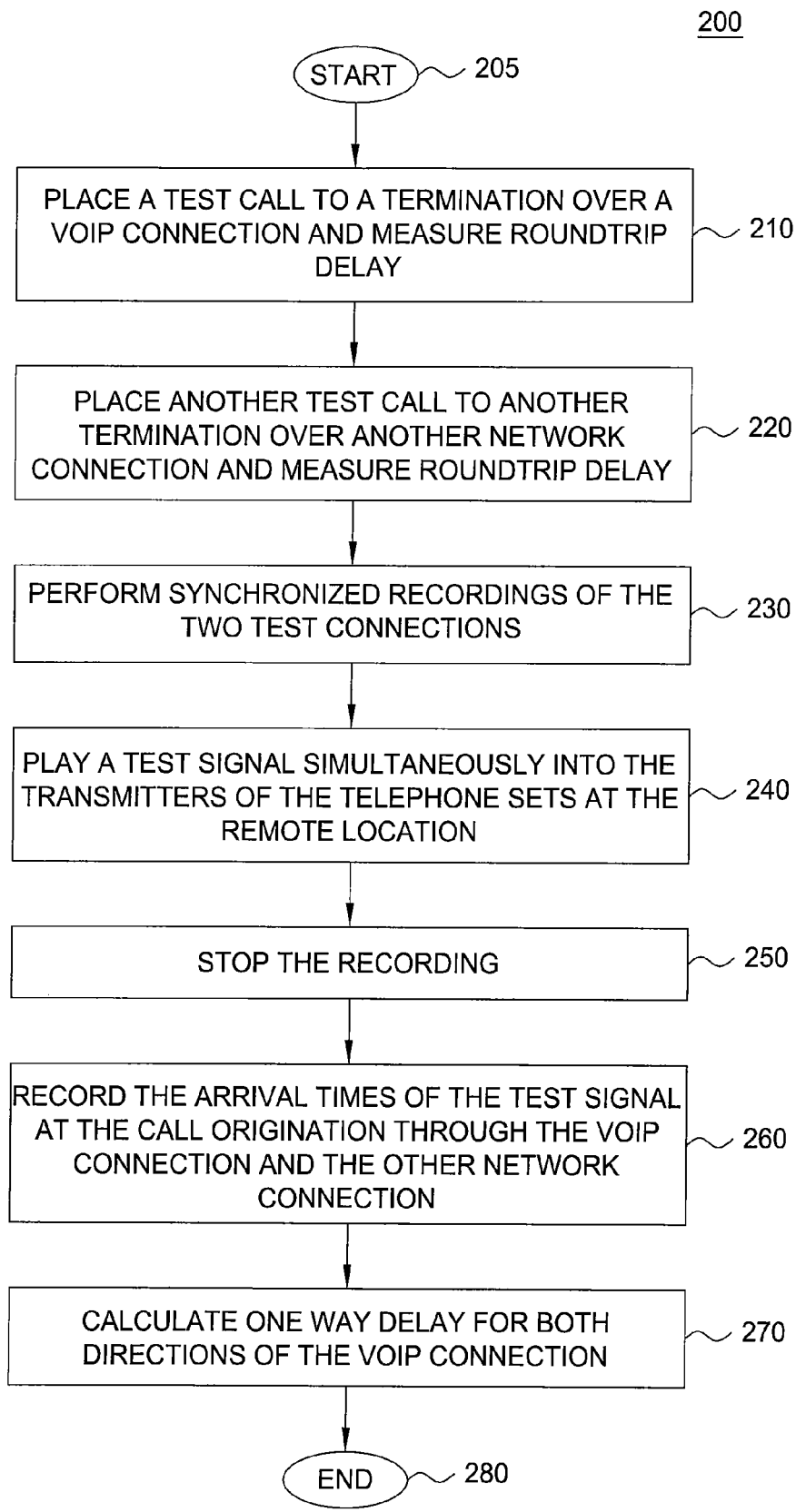
FIG. 2 illustrates a flowchart of a method for measuring one way connection delay using a single test point in a packet network, e.g., a VoIP network, of the present invention.

FIG. 2 illustrates a flowchart of a method for measuring one way connection delay using a single test point in a VoIP network of the present invention. Method 200 starts in step 205 and proceeds to step 210.

In step 210, the method places a test call to a remote or far end termination endpoint over a VoIP network service of interest and measures the roundtrip delay, RTD1. Note that $RTD1=d_{AZ1}+d_{ZA1}$ as illustrated in FIG. 1, where typically $d_{AZ1} \neq d_{ZA1}$.

In step 220, the method places another test call to a remote or far end termination endpoint over a network, such as a TDM network, with symmetric delay characteristics and measures the roundtrip delay, RTD2. Note that $RTD2=d_{AZ2}+d_{ZA2}$ as illustrated in FIG. 1, where $d_{AZ2}=d_{ZA2}$ and, therefore, $d_{AZ2}=d_{ZA2}=RTD2/2$. The call origination location is the same as that in step 210 and the remote termination endpoint location is also the same as that in step 210.

In step 230, the method performs synchronized recordings of the two test connections at the centralized call origination location, e.g., originating side A with test apparatus 121 synchronized with test apparatus 122 as illustrated in FIG. 1.

In step 240, the method plays a test signal simultaneously into the transmitters of the telephone sets, such as endpoint 111 and endpoint 112 as illustrated in FIG. 1, at the remote or far end location, such as terminating side Z illustrated in FIG. 1. The test signal can be an electrical signal coupled into the handset cords of the telephone sets or an acoustic signal (broadly an audio signal), including live speech, played into the handsets of the telephone sets at the remote location.

In step 250, the method stops the recording at the originating side of the calls.

In step 260, the method records the arrival times of the test signal at the call origination location through the VoIP path, $t_1$, and the other network path with symmetric delay, $t_2$. Note that $t_1=t_{send}+d_{ZA1}$, where $t_{send}$ is the time when the test signal was sent at the remote end and $d_{ZA1}$ is the one way delay from the remote endpoint to the call origination point using the VoIP connection. Note also that $t_2=t_{send}+d_{ZA2}$, where $t_{send}$ is the time when the test signal was sent at the remote end and $d_{ZA2}$ is the one way delay from the remote endpoint to the call origination point using the symmetric delay network connection, therefore, $t_{send}=t_2-d_{ZA2}$.

In step 270, the method calculates in both directions of the VoIP connection. Note that RTD1 and RTD2 have been measured in step 210 and step 220 respectively and $t_1$ and $t_2$ have also been measured in step 260. Since $t_{send}=t_2-d_{AZ2}=t_2-RTD2/2$ and $t_1=t_{send}+d_{ZA1}$, then $d_{ZA1}=t_1-t_{send}$, or $d_{ZA1}=t_1-(t_2-RTD2/2)$. In addition, $d_{AZ1}=RTD1-d_{ZA1}$. Thus, the one way delays in both directions of the VoIP call connection have been successfully calculated. The method ends in step 280.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

Figure 3:
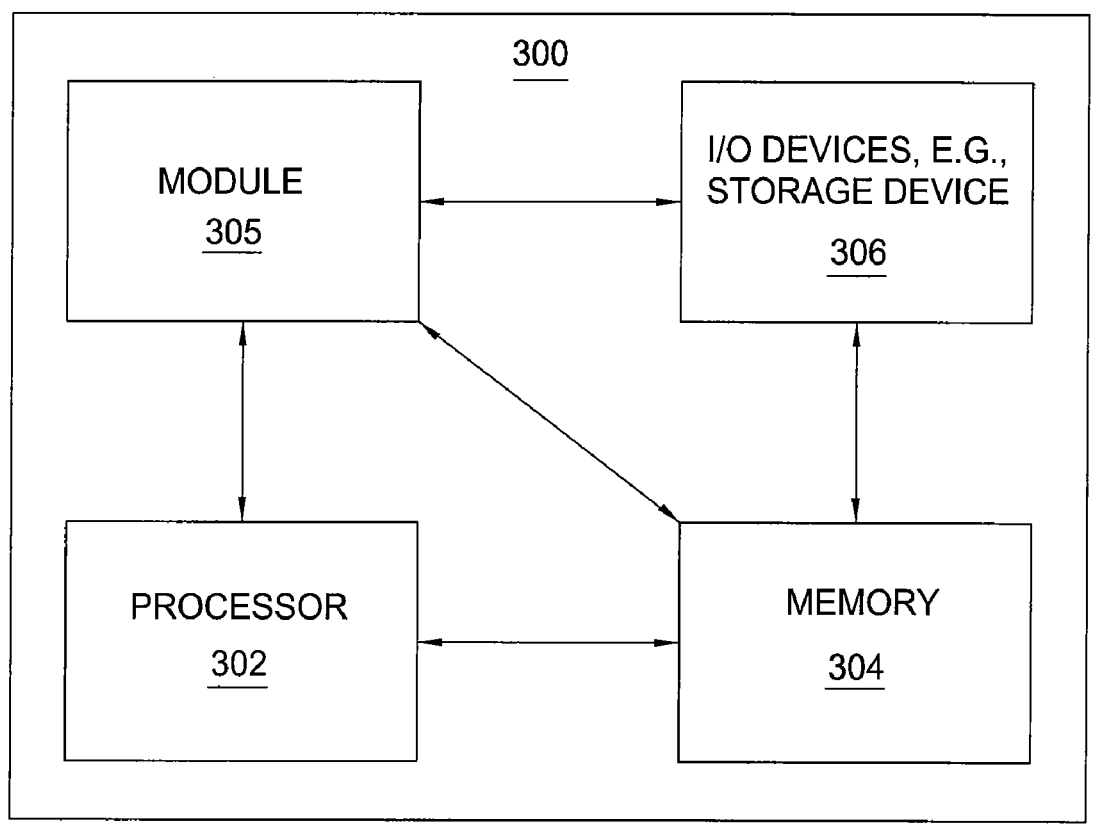
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for measuring one way connection delay using a single test point, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for measuring one way connection delay using a single test point can be loaded into memory 304 and executed by processor 302 to implement the functions as discussed above. As such, the present process 305 for measuring one way connection delay using a single test point (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for measuring a transmission delay, comprising:

measuring a first roundtrip delay (RTD1) by a processor at a first location between a first endpoint and a second endpoint over a first communication network;

measuring a second roundtrip delay (RTD2) at the first location between a third endpoint and a fourth endpoint over a second communication network with symmetric delay characteristics; and performing synchronous recordings of a test signal that is sent simultaneously from the second endpoint to the first endpoint and from the fourth endpoint to the third endpoint, to measure an arrival time ($t_1$) of the test signal over the first communication network, and, an arrival time ($t_2$) of the test signal over the second communication network $t_2$, where the first roundtrip delay, the second roundtrip delay and the arrival times ($t_1$) and ($t_2$) are used to calculate an one way transmission delay in the first communication network.

2. The method of claim 1, wherein the first communication network is a packet network.

3. The method of claim 2, wherein the packet network is a voice over internet protocol network.

4. The method of claim 1, wherein:
the arrival time ($t_1$) represents a sum of a sending time of the test signaling ($t_{send}$), and a delay from the second endpoint to the first endpoint, $d_{ZA1}$, where the first roundtrip delay comprises a sum of a delay from the first endpoint to the second endpoint, $d_{AZ1}$ and the delay from the second endpoint to the first endpoint, $d_{ZA1}$; and
the arrival time ($t_2$) represents a sum of the sending time of the test signaling ($t_{send}$) and a delay from the fourth endpoint to the third endpoint, where the delay from the fourth endpoint to the third endpoint, $d_{ZA2}$, is found by dividing the second roundtrip delay by 2.

5. The method of claim 4, wherein calculating the one way transmission delay in the first communication network comprises:
representing $d_{ZA1}=t_{send}=t_1-(t_2-RTD2/2)$; or
representing $d_{AZ1}=RTD1-d_{ZA1}$.

6. The method of claim 1, wherein the first endpoint and the third endpoint are co-located at said the first location.

7. The method of claim 1, wherein said the test signal is an audio signal or an electrical signal.

8. A non-transitory computer-readable medium having stored thereon a plurality of instructions, the plurality of instructions including instructions which, when executed by a processor, cause the processor to perform a method for measuring a transmission delay, comprising:
measuring a first roundtrip delay (RTD1) at a first location between a first endpoint and a second endpoint over a first communication network;
measuring a second roundtrip delay (RTD2) at the first location between a third endpoint and a fourth endpoint over a second communication network with symmetric delay characteristics; and
performing synchronous recordings of a test signal that is sent simultaneously from said the second endpoint to the first endpoint and from said the fourth endpoint to the third endpoint, to measure an arrival time ($t_1$) of the test signal over the first communication network, and, an arrival time ($t_2$) of said the test signal over said the second communication network $t_2$, where the first roundtrip delay, the second roundtrip delay and the arrival times ($t_1$) and ($t_2$) are used to calculate an one way transmission delay in the first communication network.

9. The non-transitory computer-readable medium of claim 8, wherein the first communication network is a packet network.

10. The non-transitory computer-readable medium of claim 9, wherein
the packet network is a voice over internet protocol network.

11. The non-transitory computer-readable medium of claim 8, wherein:
the arrival time ($t_1$) represents a sum of a sending time of the test signaling ($t_{send}$), and a delay from the second endpoint to the first endpoint, $d_{ZA1}$, where the first roundtrip delay comprises a sum of a delay from the first endpoint to said the second endpoint, $d_{AZ1}$ and the delay from the second endpoint to the first endpoint, $dz_{A1}$; and
the arrival time ($t_2$) represents a sum of the sending time of the test signaling ($t_{send}$) and a delay from the fourth endpoint to said the third endpoint, where said the delay from said the fourth endpoint to the third endpoint, $d_{ZA2}$, is found by dividing the second roundtrip delay by 2.

12. The non-transitory computer-readable medium of claim 11, wherein calculating the one way transmission delay in the first communication network comprises:
representing $d_{ZA1}=t_1-tsend=t_1-(t_2-RTD2/2)$; or
representing $d_{AZ1}=RTD1-d_{ZA1}$.

13. The non-transitory computer-readable medium of claim 8, wherein the first endpoint and the third endpoint are co-located at said the first location.

14. The non-transitory computer-readable medium of claim 8, wherein the test signal is an audio signal or an electrical signal.

15. An apparatus for measuring a transmission delay, comprising:
means for measuring a first roundtrip delay (RTD1) at a first location between a first endpoint and a second endpoint over a first communication network;
means for measuring a second roundtrip delay (RTD2) at the first location between a third endpoint and a fourth endpoint over a second communication network with symmetric delay characteristics; and
means for performing synchronous recordings of a test signal that is sent simultaneously from the second endpoint to the first endpoint and from the fourth endpoint to the third endpoint, to measure an arrival time ($t_1$) of the test signal over the first communication network, and, an arrival time ($t_2$) of the test signal over the second communication network $t_2$, where the first roundtrip delay, the second roundtrip delay and the arrival times ($t_i$) and ($t_2$) are used to calculate an one way transmission delay in the first communication network.

16. The apparatus of claim 15, wherein the first communication network is a packet network.

17. The apparatus of claim 16, wherein the packet network is a voice over internet protocol network.

18. The apparatus of claim 15, wherein:
the arrival time ($t_1$) represents a sum of a sending time of the test signaling ($t_{send}$), and a delay from the second endpoint to the first endpoint, $d_{ZA1}$, where the first roundtrip delay comprises a sum of a delay from the first endpoint to the second endpoint, $d_{AZ1}$ and the delay from the second endpoint to the first endpoint, $d_{ZA1}$; and
the arrival time ($t_2$) represents a sum of the sending time of the test signaling ($t_{send}$) and a delay from the fourth endpoint to the third endpoint, where the delay from said the fourth endpoint to the third endpoint, $d_{ZA2}$, is found by dividing the second roundtrip delay by 2.

19. The apparatus of claim 18, wherein calculating the one way transmission delay in the first communication network comprises:
representing $d_{ZA1}=t_1-t_{send}=t_1-(t_2-RTD2/2)$; or
representing $d_{AZ1}=RTD1-d_{ZA1}$.

20. The apparatus of claim 15, wherein the first endpoint and the third endpoint are co-located at the first location.

* * * * *